United States Patent
Choi et al.

(10) Patent No.: US 12,554,893 B2
(45) Date of Patent: Feb. 17, 2026

(54) SECURITY DEVICE AND OPERATION METHOD THEREOF

(71) Applicant: Samsung Electronics Co., Ltd., Suwon-si (KR)

(72) Inventors: Gwangbae Choi, Suwon-si (KR); Jisoo Kim, Suwon-si (KR); Sungho Yoon, Suwon-si (KR); Younsung Chu, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 9 days.

(21) Appl. No.: 18/743,742

(22) Filed: Jun. 14, 2024

(65) Prior Publication Data
US 2025/0173465 A1 May 29, 2025

(30) Foreign Application Priority Data

Nov. 23, 2023 (KR) ........................ 10-2023-0164863

(51) Int. Cl.
*G06F 21/72* (2013.01)
*G06F 21/60* (2013.01)

(52) U.S. Cl.
CPC ............ *G06F 21/72* (2013.01); *G06F 21/602* (2013.01)

(58) Field of Classification Search
CPC ................................ G06F 21/72; G06F 21/602
See application file for complete search history.

(56) References Cited

U.S. PATENT DOCUMENTS

| | | | | |
|---|---|---|---|---|
| 7,831,039 B2 * | 11/2010 | Bertoni | ................. | H04L 9/0637 |
| | | | | 713/181 |
| 8,233,619 B2 * | 7/2012 | Bertoni | ................. | H04L 9/0637 |
| | | | | 380/37 |
| 10,218,497 B2 | 2/2019 | Suresh et al. | | |
| 2022/0138349 A1 | 5/2022 | Saarinen | | |
| 2023/0327854 A1 * | 10/2023 | Zibaeenejad | ......... | H04L 9/0643 |
| 2024/0235811 A1 * | 7/2024 | Mukai | .................... | H04L 9/3242 |

FOREIGN PATENT DOCUMENTS

| | | | | | |
|---|---|---|---|---|---|
| CN | 112787820 A | * | 5/2021 | ........... | H04L 9/3234 |
| CN | 112787820 B | | 5/2022 | | |
| CN | 114615069 B | | 11/2022 | | |
| WO | 2023/285830 A1 | | 1/2023 | | |

* cited by examiner

*Primary Examiner* — Ayoub Alata
(74) *Attorney, Agent, or Firm* — Fish & Richardson P.C.

(57) ABSTRACT

Disclosed is a security circuit which includes an initial value adjustment circuit configured to adjust an initial value based on an index value and output an adjustment initial value, a security circuit including a plurality of unit security circuits, each of which outputs encrypted data or decrypted data or both encrypted and decrypted data and a first tag from input data based on the adjustment initial value, on a secret key, on a nonce, on the input data, and on associated data associated with the input data, and a tag integration circuit that merges the first tags from the plurality of unit security circuits to output a second tag.

20 Claims, 10 Drawing Sheets

SECURITY DEVICE AND OPERATION METHOD THEREOF

CROSS-REFERENCE TO RELATED APPLICATIONS

This application claims priority under 35 U.S.C. § 119 to Korean Patent Application No. 10-2023-0164863 filed on Nov. 23, 2023, in the Korean Intellectual Property Office, the disclosures of which are incorporated by reference herein in their entireties.

BACKGROUND

Various example embodiments relate to a security device and/or an operation method thereof.

The Internet has evolved from a human-centered connection network in which humans generate and consume pieces of information to an Internet of things (IoT) network for transmitting and receiving and processing pieces of information between distributed components such as things. To implement the IoT, technical elements, such as one or more of a sensing technology, wired and/or wireless communication, a network infrastructure, a service interface technology, and a security technology, are required. An advanced encryption standard (AES) technology is widely used in conjunction with the security technology. However, it is difficult for the AES technology to be applied to the IoT because associated hardware is large in size. Thus, there is a need or a desire for a lightweight security technology.

SUMMARY

Various example embodiments may provide a security device for performing distributed processing and/or an operation method thereof.

According to various example embodiments, a security device may include an initial value adjustment circuit configured to adjust an initial value based on an index value and to output an adjustment initial value, a security circuit including a plurality of unit security circuits, each of which is configured to output encrypted data, decrypted data, or both encrypted and decrypted data, and to output a first tag from input data based on the adjustment initial value, on a secret key, on a nonce, on the input data, and on associated data associated with the input data, and a tag integration circuit configured to output a second tag by merging the first tags from the plurality of unit security circuits.

Alternatively or additionally according to various example embodiments, an operation method of a security device may include adjusting an initial value based on an index value and outputting an adjustment initial value, outputting encrypted data, decrypted data, or both decrypted data and encrypted data and first tags in parallel from input data, the outputting based on the adjustment initial value, on a secret key, on a nonce, the input data, and on associated data associated with the input data, and to output a second tag by merging the first tags output in parallel.

Alternatively or additionally according to various example embodiments, a security device may include a memory and a processor connected with the memory and configured to execute at least one instruction. The processor may be configured to execute the at least one instruction to cause the security device to adjust an initial value based on an index output and output an adjustment initial value, to output encrypted data or decrypted data or both encrypted and decrypted data and first tags in parallel from input data, based on the adjustment initial value, on a secret key, a nonce, on the input data, and on associated data associated with the input data output, and to output a second tag by merging the first tags output in parallel.

BRIEF DESCRIPTION OF THE FIGURES

The above and other objects and features of inventive concepts will become apparent by describing in detail various example embodiments thereof with reference to the accompanying drawings.

DETAILED DESCRIPTION

Hereinafter, embodiments of the present disclosure may be described in detail and clearly to such an extent that an ordinary one in the art easily implements inventive concepts.

Figure 1:
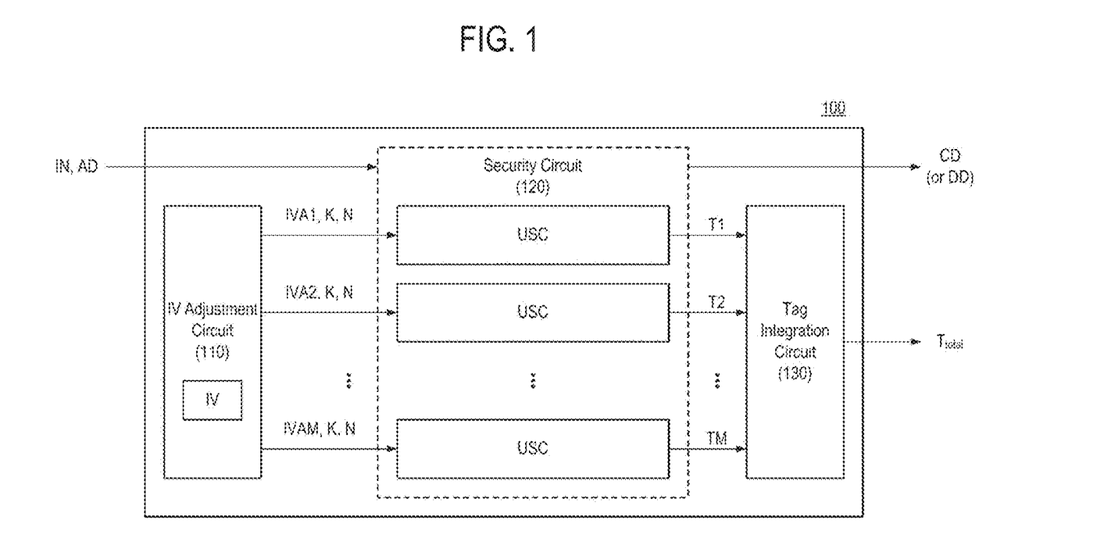
FIG. 1 illustrates a security device of the present disclosure according to some example embodiments.

FIG. 1 illustrates a security device of inventive concepts according to some example embodiments.

Referring to FIG. 1, a security device 100 may be configured to receive input data IN and encrypt and/or decrypt the input data IN. Furthermore, the security device 100 may be configured to output a tag for data verification. The security device 100 may include an initial value (IV) adjustment circuit 110, a security circuit 120, and a tag integration circuit 130.

The IV adjustment circuit 110 may be configured to adjust an initial value IV based on an index value, and may output adjustment initial values IVA1 to IVAM. The initial value IV may be or may include or be included in a value initially set in the security device 100. The initial value IV may include various fixed values depending on parameters used in the security device 100 and the configuration of the security device 100.

As the initial value IV is set to the fixed value, the IV adjustment circuit 110 may adjust the fixed initial value IV to provide a plurality of unit security circuits USCs included in the security circuit 120 with different adjustment initial values IVA1 to IVAM. A number of index values for adjustment may be the same as the number of the plurality of unit security circuits USCs, each of the index values for adjustment and may be different values for every the plurality of unit security circuits USCs.

The IV adjustment circuit 110 may provide the security circuit 120 with a secret key K and a salt and/or nonce N, together with the adjustment initial values IVA1 to IVAM.

The security circuit 120 may be configured to receive the input data IN and associated data AD and may output encrypted data CD and/or decrypted data DD, as well as tags for the input. According to various example embodiments, when the security circuit 120 is configured to perform encryption, the security circuit 120 may provide the encrypted data CD. Alternatively or additionally when the security circuit 120 is configured to perform decryption, the security circuit 120 may provide the decrypted data DD.

In various inventive concepts, the associated data AD may be data associated with the input data IN, which may function as a kind of label. Thus, when the associated data AD is used for encryption and is then used for decryption, decryption may succeed or fail according to a type of the associated data AD.

The security circuit 120 may include the plurality of unit security circuits USCs for distributed processing. The plurality of unit security circuits USCs may be configured to be connected with each other in parallel, e.g. in a wired manner and/or a wireless manner. The plurality of unit security circuits USCs may be provided with M unit security circuits (where M is a natural number greater than or equal to zero, or greater than or equal to one).

The plurality of unit security circuits USCs may receive different adjustment initial values IVA1 to IVAM from the IV adjustment circuit 110 and may receive the same secret key K and the same nonce N. For example, the secret key K and the nonce N may be a value common to the plurality of unit security circuits USCs. Thus, because the secret key K and the nonce N in the same size are able to be used for the at least one security device 100, although the plurality of unit security circuits USCs are used for distributed processing, the secret key K and the nonce N may be maintained in size.

However, because all the pieces of input data IN will be the same as each other in terms of the input terminals of the plurality of unit security circuits USCs when the same nonce N is reused, there may be a problem in which an attacker is able to identify whether the pieces of input data IN (e.g., plaintext data) to be input to the plurality of unit security circuits USCs are the same values as each other. According to various example embodiments, however, inventive concepts may adjust initial values with fixed values and may respectively apply the adjusted initial values to the plurality of unit security circuits USCs, thus resolving or improving upon a security issue of the attacker for the input data IN while maintaining the size of the secret key K and the size of the nonce N.

Each unit security circuit USC may be configured to output the encrypted data CD and/or the decrypted data DD and a first tag (T1, T2, . . . or TM) from the input data IN, based on the adjustment initial value (IVA1, IVA2, . . . , or IVAM), the secret key K, the nonce N, the input data IN, and the associated data AD. Thus, the plurality of pieces of encrypted data CD, the plurality of pieces of decrypted data DD, and the plurality of first tags T1 to TM may be output in parallel from the security circuit 120. A detailed description of each unit security circuit USC will be described below.

The tag integration circuit 130 may be configured to merge the plurality of first tags T1 to TM provided from the plurality of unit security circuits USCs to output a second tag $T_{total}$.

According to various example embodiments, the tag integration circuit 130 may perform merging such that the second tag $T_{total}$ has the same size as the size of each of the first tags T1 to TM, to prevent or reduce the likelihood of the size of the tag from increasing due to distributed processing according to the plurality of unit security circuits USCs. For example, when the size of each of the first tags T1 to TM is Tsize, the second tag $T_{total}$ may have Tsize, rather than M*Tsize.

For example, the tag integration circuit 130 may output the second tag $T_{total}$ based on XORing (exclusive-OR'ing) the plurality of first tags T1 to TM from the plurality of unit security circuits USCs.

When performing encryption using the same secret key K, there may be a problem associated with a difficulty in which an attacker finds an encrypted/decrypted data pair with the same valid tag as the second tag $T_{total}$ into the first tags T1 to TM are merged. It may be required or desirable to finally find desired specific first tags T1 to TM to find the second tag $T_{total}$. However, when the case of using one security circuit 120 or the case of using the plurality of unit security circuits USCs for distributed processing according inventive concepts has the same structure, the same level of difficulty may be required or desirable. Thus, although distributed processing may be performed, security may be maintained.

Likewise, although the same nonce N is reused, because the difficulty in which both the above-mentioned cases find decrypted data with a specific tag will be required or desirable, the security of inventive concepts may be maintained.

According to the above-mentioned embodiments, the security device 100 of inventive concepts may reduce a computation time through distributed processing by using the plurality of unit security circuits USCs, thus improving the efficiency of encryption and/or decryption. Alternatively or additionally, simultaneously, the security device 100 may adjust the initial value while adjusting the secret key K, the nonce N, the encrypted data, and the size of the tag, thus maintaining or improving the security.

Figure 2:
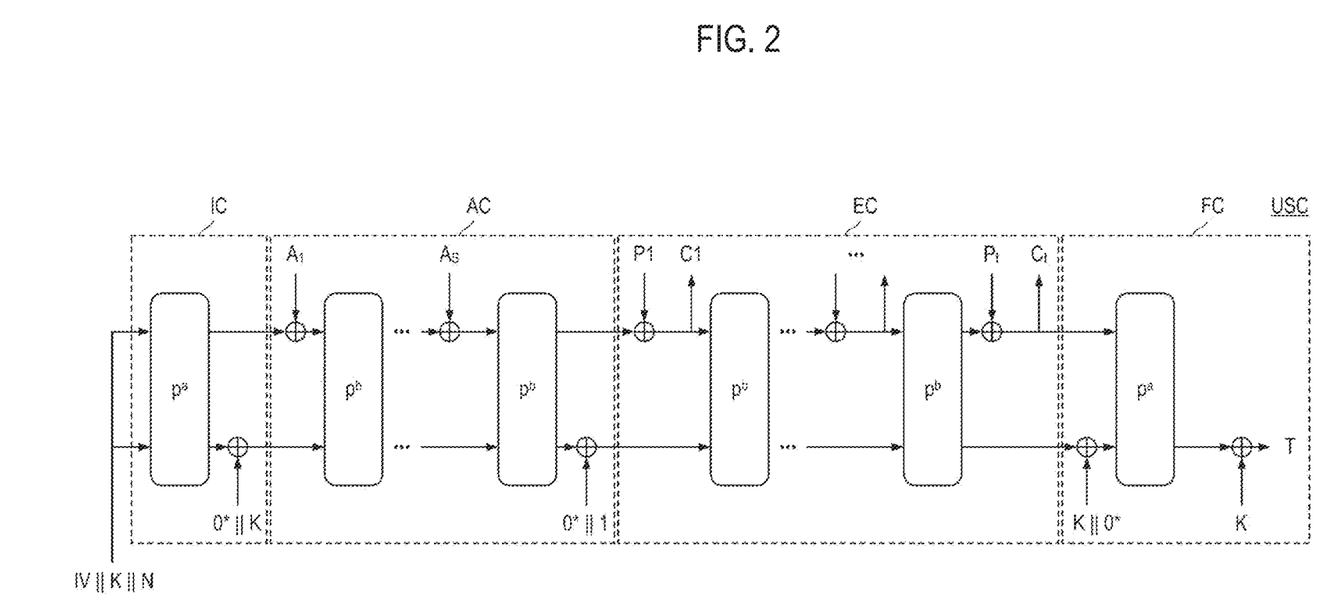
FIG. 2 illustrates a unit security circuit for encryption.

FIG. 2 illustrates a unit security circuit for encryption.

Referring to FIG. 2, a unit security circuit USC may be configured to perform the Ascon algorithm. Hereinafter, the Ascon algorithm will be described in detail. Various example embodiments may use the lightweight Ascon algorithm in lieu of Automated Encryption Standard (AES) algorithms, e.g., in lieu of AES-GCM algorithms.

Ascon Algorithm

The Ascon algorithm is a lightweight authenticated cipher algorithm. The Ascon algorithm may be configured based on a duplex sponge structure such as Sponge Wrap and MonkeyDuplex. By having the sponge structure, the Ascon algorithm may be used for one or more of encryption, hash, or a message authentication code (MAC), or the like.

To perform the Ascon algorithm, the unit security circuit USC may include an initialization circuit IC, an association data processing circuit AC, an encryption circuit EC, and a finalization circuit FC. Furthermore, the unit security circuit USC may further include a padding circuit (not shown). Hereinafter, a detailed operation of the Ascon algorithm will be described based on each circuit. In inventive concepts, the "circuit" may be implemented as a module, a block, and/or the like. In this case, a circuit (or a module and/or a block) associated with various example embodiments, a method through the circuit, an algorithm, or a function may be implemented as hardware and/or a software module executed by a processor, or a combination thereof.

As described above, parameters associated with the Ascon algorithm may be defined as follows according to inventive concepts.

K: secret key
N: nonce
P: plaintext data
C: ciphertext data
A: associated data
T: tag
r: rate or message block size
c: capacity
IV: initial value
p: round permutation
a or b: round number of round permutation p
0*: a bit string which has a variable length and includes all bits which are "0"

The message block size of the Ascon algorithm may be r bits corresponding to the above-mentioned rate (where r is a natural number greater than or equal to zero or greater than or equal to one). Padding processing of the plaintext data used in the Ascon algorithm may be performed. A padding circuit (not shown) may perform a padding process of adding one "1" and an appropriate number such as a minimum number of "0" to the plaintext data, such that the length of the padded plaintext data is a multiple of r bits. The plaintext data may be segmented into t blocks P1 to Pt, each of which has r bits, by use of the padding circuit (not shown) (where t is a natural number greater than or equal to zero or greater than or equal to one).

Alternatively or additionally, the padding circuit (not shown) may perform the padding process for associated data. Alternatively or additionally, the padding circuit (not shown) may segment the associated data into s blocks A1 to As, each of which has r bits, (where s is a natural number or greater than or equal to one).

Before description of each circuit, the Ascon algorithm may include two paths. The two paths may be configured to connect respective circuits. A first path among the two paths may be defined as a path for encryption or decryption, and a second path may be defined as a path for a tag. Each circuit may include a round permutation block $p^a$ and a round permutation block $p^b$. Each round permutation block may perform round conversion repeated by a round number "a" or "b". For example, the round conversion may be based on a substitution permutation network (SPN).

The round conversion may be performed for a certain state. The state may include a plurality of divided words. Each word may include or be a specific number of bits (e.g., 64 bits). The round conversion may include an operation of adding a round constant to the state, an operation of substituting each word included in the state, and an operation of diffusing or permuting each word. Herein, the substitution operation may be defined as an operation of applying a substitution box (an S-box) of a specific size in a bit segmentation scheme a specific number of times in parallel (a direction in which different words are arranged). The diffusion operation may be defined as an operation of mixing bits of each word based on XOR computation in each word.

Initialization

The initialization circuit IC may generate an initialization state of the Ascon algorithm. The initialization state may be generated based on a secret key K, a nonce N, and an initial value IV for specifying the Ascon algorithm. For example, the initialization state may be defined as IV∥K∥N. Herein, an operator x∥y may be defined as concatenating the bit strings x and y.

As described above, the initial value IV may be set to the initially fixed value and may be set based on at least one of, for example, a size of the secret key K, a rate, and a round number. For example, the initial value IV may be set to 80400c0600000000 in the Ascon-128 algorithm and may be set to 80800c0800000000 in the Ascon-128a algorithm.

The initialization circuit IC may apply the round permutation block $p^a$ to the initialization state.

Furthermore, the initialization circuit IC may XOR the round permuted initialization state and 0*∥K (e.g., a string of 0's concatenated with the secret key K) on the second path and may output the XORed result.

Association Data Processing

The association data processing circuit AC may be configured to process pieces of associated data $A_1$ to $A_s$.

The association data processing circuit AC may include a plurality of round permutation blocks $p^b$. The first round permutation block $p^b$ may deliver a state converted by being applied to the result of XORing the state output through the initialization circuit IC and the first associated data $A_1$ to the next round permutation block $p^b$. Each round permutation block $p^b$ may provide the next block with a state converted by being applied to the result of XORing the state provided from the previous block and ith (where i is a natural number greater than or equal to zero or greater than or equal to one) associated data $A_i$. When all the pieces of associated data $A_1$ to $A_s$ are processed, the association data processing circuit AC may XOR the output state of the last round permutation block $p^b$ and 0*∥1 (e.g., a string of 0's concatenated with a 1) on the second path and may output the XORed result.

Encryption Processing

The encryption circuit EC may include a plurality of round permutation blocks $p^b$. The encryption circuit EC may receive pieces of plaintext data $P_1$ to $P_t$ as input data. The first round permutation block $p^b$ may deliver a state converted by being applied to the result of XORing the state output through the association data processing circuit AC and the first plaintext data $P_1$ to the next round permutation block $p^b$. Each round permutation block $p^b$ may provide the next block with a state converted by being applied to the result of XORing the state provided from the previous block and ith plaintext data $P_i$. At this time, the result of XORing the state provided from the previous block and the ith plaintext data $P_i$ may be output as the encrypted data $C_i$. For example, each encrypted data $C_i$ may be output before being input to the next round permutation block $p^b$ after being XORed.

Finalization

The finalization circuit FC may apply the round permutation block $p^a$ to the result of XORing the state output through the encryption circuit EC and K∥0* on the second path and may XOR the state output from the round permutation block $p^a$ and the secret key K, thus finally obtain a tag.

Figure 3:
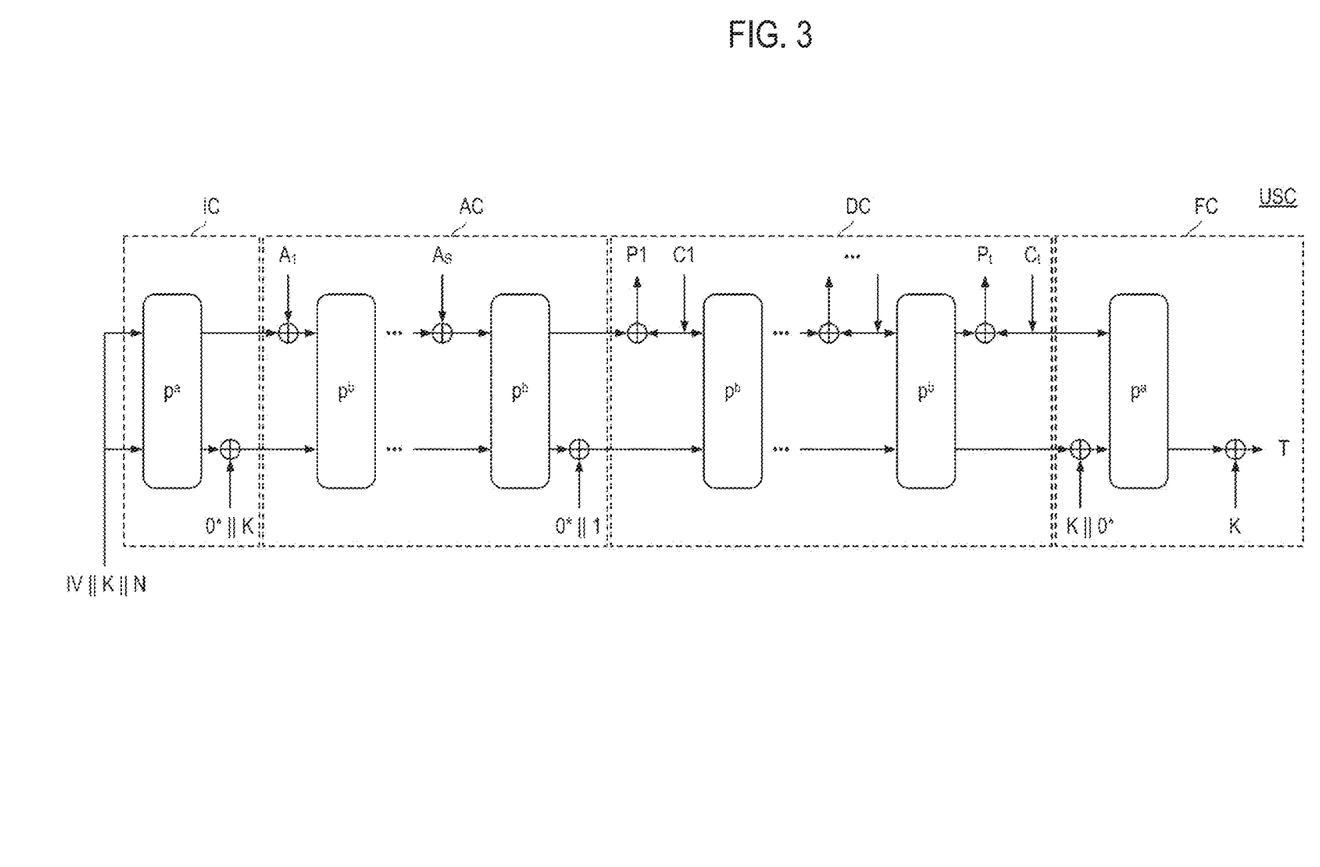
FIG. 3 illustrates a unit security circuit for decryption.

FIG. 3 illustrates a unit security circuit for decryption. Hereinafter, a detailed description of a portion duplicated with FIG. 2 will be omitted.

A unit security circuit for decryption may have the same structure (the initialization circuit IC, the association data processing circuit AC, and the finalization circuit FC) except for the encryption circuit EC. However, the encryption circuit EC may be replaced with a decryption circuit DC.

Decryption Processing

The decryption circuit DC may include a plurality of round permutation blocks $p^b$. The decryption circuit DC may receive pieces of encrypted data $C_1$ to $C_t$ as input data. The first round permutation block $p^b$ may deliver a state converted by being applied to the result of XORing the state output through the association data processing circuit AC and the first encrypted data $C_1$ to the next round permutation block $p^b$. Each round permutation block $p^b$ may provide the next block with a state converted by being applied to the result of XORing the state provided from the previous block and ith encrypted data $C_i$. At this time, the result of XORing the state provided from the previous block and the ith encrypted data $C_i$ may be output as the decrypted data (e.g., plaintext data) $P_i$.

Hereinafter, a description will be given of various embodiments of inventive concepts for distributed processing of the above-mentioned Ascon algorithm with reference to FIGS. 4 to 7.

Figure 4:
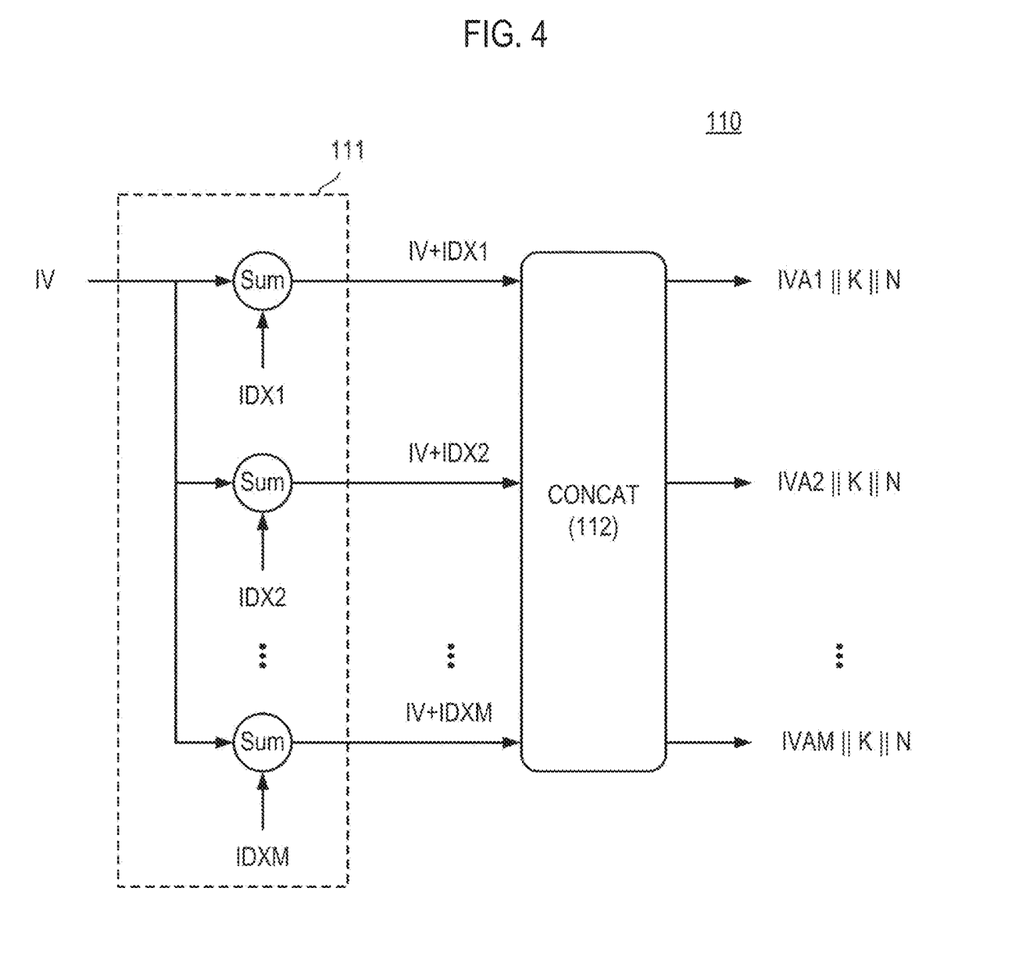
FIG. 4 illustrates an initial value adjustment circuit of FIG. 1 according to some example embodiments.

FIG. 4 illustrates an initial value adjustment circuit of FIG. 1 according to some example embodiments.

Referring to FIG. 4, an initial value (IV) adjustment circuit 110 may be configured to output adjustment initial values IVA1 to IVAM based on summing an initial value IV and index values IDX1 to IDXM. In detail, the IV adjustment circuit 110 may include a plurality of sum blocks 111 and a concatenation block 112.

The plurality of sum blocks 111 may be provided by the number M of a plurality of unit security circuits. The respective sum blocks may receive the initial value IV and may sum the initial value IV and the different initial values IDX1 to IDXM to output the adjustment initial values IVA1 to IVAM. Thus, the adjustment initial values IVA1 to IVAM may vary every one of the plurality of unit security circuits.

The concatenation block 112 may be configured to concatenate the respective adjustment initial values IVA1 to IVAM, a secret key K, and a nonce N. The above-mentioned initialization state may be provided with IVA∥K∥N through the concatenation block 112 (where IVA is one of the adjustment initial values IVA1 to IVAM). As a result, different initialization states may be provided to respective unit security circuits and may be used as inputs of the above-mentioned initialization operation. Thus, although the secret key K and the nonce N are maintained in size, because different initialization states are able to be provided to the security circuit, security for plaintext data may be maintained or improved.

Figure 5:
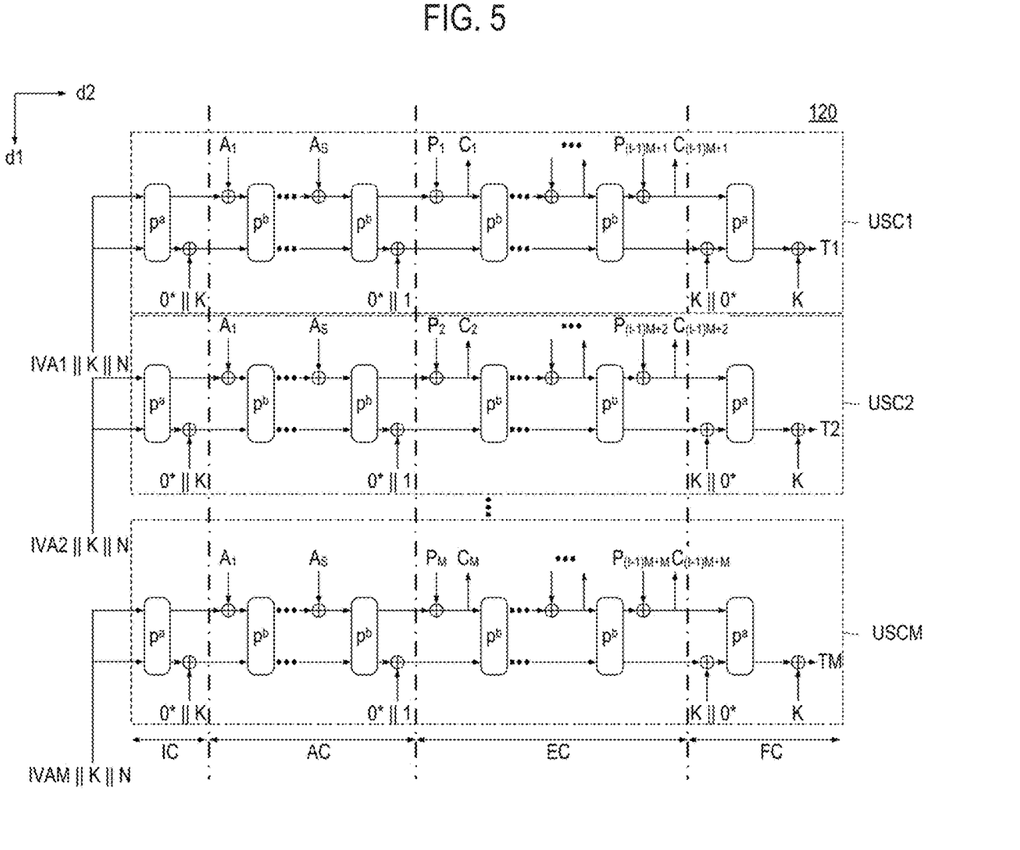
FIG. 5 illustrates a security circuit of FIG. 1 according to some example embodiments.

FIG. 5 illustrates a security circuit of FIG. 1 according to some example embodiments.

Referring to FIG. 5, as described above, a security circuit 120 may include a plurality of M unit security circuits USC1 to USCM. The security circuit 120 may be configured for encryption. Thus, the security circuit 120 may output pieces of encrypted data $C_1$ to $C_{(t-1)*M+M}$ by using pieces of plaintext data $P_1$ to $P_{(t-1)*M+M}$ as input data.

In some example embodiments, the plurality of unit security circuits USC1 to USCM may be arranged along a direction d1 and may be connected with each other in parallel; however, example embodiments are not limited thereto. Each of the plurality of unit security circuits USC1 to USCM may include an initialization circuit IC, an association data processing circuit AC, an encryption circuit EC, and a finalization circuit FC), for example according to FIG. 2 described above. Each of the plurality of unit security circuits USC1 to USCM may be configured to have a structure in which a plurality of round permutation blocks, each of which applies round permutation by a specific round number, are sequentially connected with each other.

The plurality of round permutation blocks may be configured to be connected with a first path and a second block.

The first path may output pieces of encrypted data $C_1$ to $C_{(t-1)*M+M}$ based on XORing the pieces of input data $P_1$ to $P_{(t-1)*M+M}$ and associated data and on the output of at least one of the plurality of round permutation blocks. The second path may output first tags T1 to TM based on XORing the secret key K and the output of the at least one round permutation block.

Each of the plurality of unit security circuits USC1 to USCM may receive a different initial state. The different adjustment initial values IVA1 to IVAM may be concatenated together with the secret key K and the nonce N in each initial state.

The initialization circuit IC of each of the unit security circuits USC1 to USCM may generate a first state, based on applying a first round permutation block with a first round number to the different adjustment initial values IVA1 to IVAM defining the initial state, on the secret key K, and on the nonce N. For example, the first round permutation block may be the above-mentioned $p^a$, and the first round number may be "a". The first state may be provided to the association data processing circuit AC.

The association data processing circuit AC may generate a second state, based on applying a plurality of second round permutation blocks with a second round number to the first state and the associated data. For example, the second round permutation block may be the above-mentioned $p^b$, and the second round number may be "b". The associated data may be input on the first path and may be XORed with the first state. The second state may be provided to the encryption circuit EC.

The encryption circuit EC may generate a third state and pieces of encrypted data $C_1$ to $C_{(t-1)*M+M}$, based on applying the plurality of second round permutation blocks to the second state and the pieces of input data $P_1$ to $P_{(t-1)*M+M}$.

The pieces of input data $P_1$ to $P_{(t-1)*M+M}$ may be or may include or be included in plaintext data and may be input on the first path. According to some example embodiments, the pieces of input data $P_1$ to $P_{(t-1)*M+M}$ may include t*M data blocks. Herein, t may be a natural number greater than or equal to zero or one which is the number of data blocks capable of being processed by each of the plurality of unit security circuits USC1 to USCM, and M may be defined as a natural number greater than or equal to zero or one which is the number of the plurality of unit security circuits USC1 to USCM as described above.

The plurality of data blocks may be sequentially input to the plurality of unit security circuits USC1 to USCM along a direction such as along the direction d1 in which the plurality of unit security circuits USC1 to USCM are arranged. For example, when viewed from the encryption circuit (EC) stage, $P_1$ to $P_M$ may be sequentially input to the first second round permutation blocks arranged along the direction d1. Thereafter, data blocks may be sequentially input to the second round permutation blocks again. The data blocks may be sequentially input along the direction d1, may be shifted along a direction d2 to be repeatedly and sequentially input along the direction d1. Thus, $P_{(t-1)*M+1}$ to $P_{(t-1)*M+M}$ may be input to the last second round permutation blocks.

For distributed processing of the data blocks, each of the plurality of unit security circuits USC1 to USCM may be configured to encrypt t data blocks. Thus, in terms of the encryption circuit EC, t*M data blocks may be encrypted and t*M encrypted data $C_1$ to $C_{(t-1)*M+M}$ may be output.

The finalization circuit FC may generate first tags T1 to TM, based on applying the first round permutation block to the third state. In detail, the finalization circuit FC may generate the first tags T1 to TM, based on XORing the third state and a fourth state generated from the first round permutation block and the secret key K.

As a result, the plurality of unit security circuits USC1 to USCM may generate M first tags T1 to TM by using the finalization circuit FC. The generated M first tags T1 to TM may be merged into a second tag by means of a tag integration circuit (e.g., FIG. 1) connected with output terminals of the plurality of unit security circuits USC1 to USCM.

Figure 6:
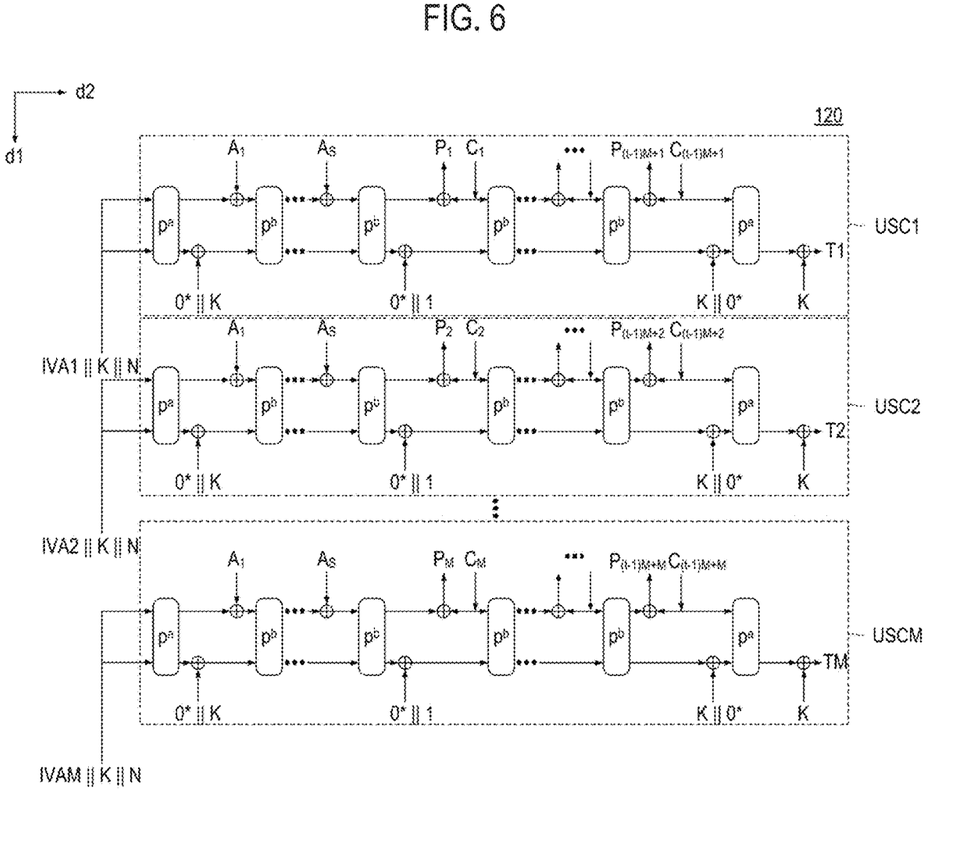
FIG. 6 illustrates a security circuit of FIG. 1 according to some example embodiments.

FIG. 6 illustrates a security circuit of FIG. 1 according to various example embodiments. Hereinafter, a detailed description of a portion duplicated with FIG. 5 will be omitted.

Referring to FIG. 6, a security circuit 120 may include a plurality of M unit security circuits USC1 to USCM, which may be configured for decryption. Thus, the security circuit 120 may output pieces of decrypted data (i.e., pieces of plaintext data $P_1$ to $P_{(t-1)*M+M}$) by using pieces of encrypted data $C_1$ to $C_{(t-1)*M+M}$ as input data.

The unit security circuits USC1 to USCM for decryption may have the same structure (an initialization circuit IC, an association data processing circuit AC, and a finalization circuit FC) as that in FIG. 5 except for an encryption circuit EC. However, the encryption circuit EC may be replaced with a decryption circuit DC.

Like encryption, each of the plurality of unit security circuits USC1 to USCM may receive different initial states in which different adjustment initial values IVA1 to IVAM are concatenated together with a secret key K and a nonce N. The initial state may be output as a first state through the initialization circuit IC, and the first state may be output as a second state through the association data processing circuit AC together with associated data.

The decryption circuit DC may generate a third state and pieces of encrypted data $P_1$ to $P_{(t-1)*M+M}$, based on applying a plurality of second round permutation blocks to the second state and the pieces of input data $C_1$ to $C_{(t-1)*M+M}$.

The pieces of input data $C_1$ to $C_{(t-1)*M+M}$ may be or may include or be included in pieces of encrypted data and may be input on a first path. According to some example embodiments, the pieces of input data $C_1$ to $C_{(t-1)*M+M}$ may include t*M data blocks and may be sequentially input to the plurality of unit security circuits USC1 to USCM, for example, along a direction d1 according to the above-mentioned embodiments. For example, when viewed from the decryption circuit (DC) stage, $C_1$ to $C_M$ may be sequentially input to the first second round permutation blocks arranged along the direction d1. Thereafter, data blocks may be sequentially input to the second round permutation blocks again. The data blocks may be sequentially input along the direction d1 and may be shifted along a direction d2 to be repeatedly and sequentially input along the direction d1. Thus, $C_{(t-1)*M+1}$ to $C_{(t-1)*M+M}$ may be input to the last second round permutation blocks.

For distributed processing of the data blocks, each of the plurality of unit security circuits USC1 to USCM may be configured to decrypt t data blocks. Thus, in terms of decryption circuit DC, t*M data blocks may be decrypted and t*M decrypted data $P_1$ to $P_{(t-1)*M+M}$ may be output.

The finalization circuit FC may generate M first tags T1 to TM. The generated M first tags T1 to TM may be merged into a second tag by means of a tag integration circuit (e.g., FIG. 1) connected with output terminals of the plurality of unit security circuits USC1 to USCM.

According to various example embodiments, the security device 120 of inventive concepts may perform distributed processing of data blocks to perform encryption or decryption. When the nonce N is reused, because the input (the above-mentioned initial state) of the security circuit 120 is able to be the same, the security device 120 may verify whether pieces of input data (plaintext data or encrypted data) subsequently input to the encryption circuit EC or the decryption circuit DC are the same as each other. Inventive concepts may apply different adjustment initial values IVA1 to IVAM to the initialization circuit IC, thus preventing or reducing the likelihood of and/or impact from a problem in which input data is identified although the same nonce N is used. Alternatively or additionally, the efficiency of an encryption or decryption operation may increase through distributed processing.

Figure 7:
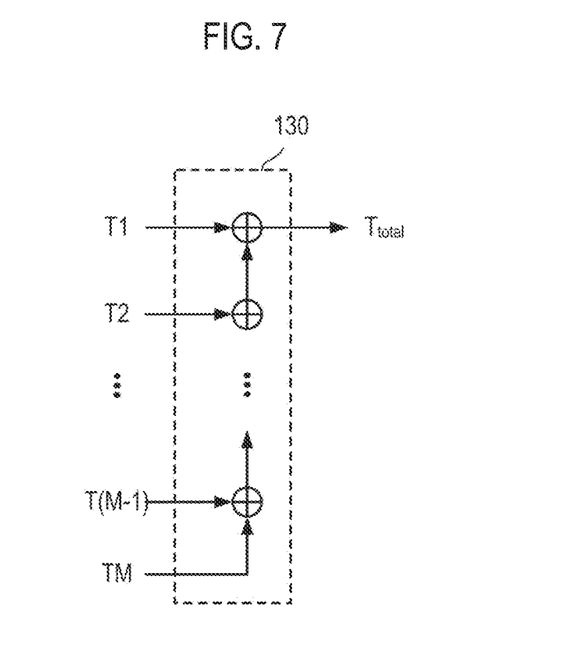
FIG. 7 illustrates a tag integration circuit according to some example embodiments.

FIG. 7 illustrates a tag integration circuit according to some example embodiments.

Referring to FIG. 7, a tag integration circuit 130 may include a plurality of XOR blocks. The respective XOR blocks may be arranged along a direction (e.g., d1 in FIGS. 5 and 6) in which a plurality of unit security circuits are arranged. Receiving an (M−1)st first tag T(M−1) and an Mth first tag TM, the XOR block may XOR the two received first tags and may provide another XOR block connected therewith with the XORed result. The remaining XOR blocks may XOR one first tag and the XORed results provided from the other XOR blocks. Receiving the first first tag T1, the XOR block may XOR the XORed results of the remaining XOR blocks and the first first tag T1 and may output a second tag $T_{total}$.

Figure 8:
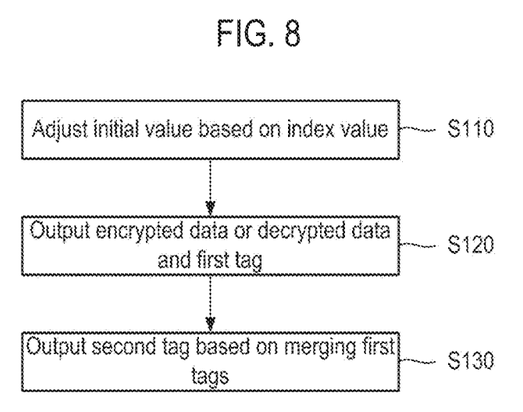
FIG. 8 is a flowchart of an operation method of a security device of the present disclosure according to some example embodiments.

FIG. 8 is a flowchart of an operation method of a security device of inventive concepts according to some example embodiments.

Referring to FIG. 8, in operation S110, the security device may adjust an initial value based on an index value and may output an adjustment initial value. The adjustment initial values may be output by the number M of a plurality of unit adjustment circuits included in the security device and may be different values.

In operation S120, the security device may output encrypted data or decrypted data and first tags in parallel from input data, based on the adjustment initial value, a secret key, a nonce, the input data, and associated data. The operation of outputting the encrypted data or the decrypted data and the first tags in parallel may be performed by means of the plurality of unit adjustment circuits. Thus, the plurality of first tags may be output through operation S120.

In operation S130, the security device may merge the first tags output in parallel to output a second tag. The second tag may be output to have the same size as one first tag.

In various example embodiments, operations S120 and S130 may be performed based on a plurality of round permutation blocks, each of which applies round permutation by a specific round number. Furthermore, operation S130 may be performed based on XORing the first tags output in parallel.

Figure 9:
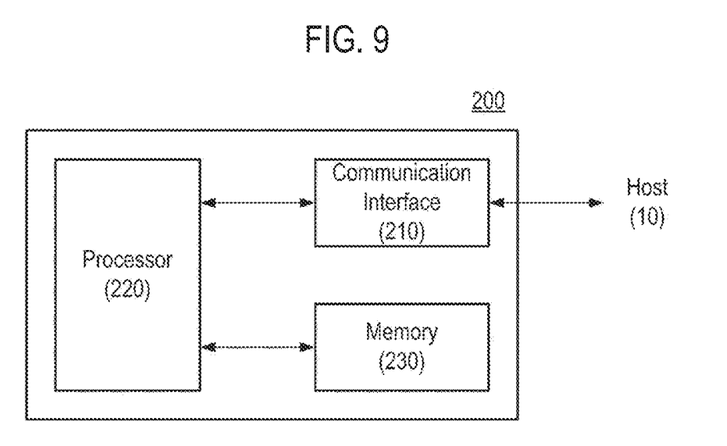
FIG. 9 illustrates a security device of the present disclosure according to some example embodiments.

FIG. 9 illustrates a security device of inventive concepts according to some example embodiments.

Referring to FIG. 9, a security device 200 may be configured to be independent of another security device and may access only an authenticated application. The security device 200 may be configured to be physically separated from another hardware configuration and may be configured to perform encryption/decryption of data or perform an operation or function of a security device (e.g., FIGS. 1 to 8) according to various example embodiments.

For example, a TEE, one or more of an embedded secure element (eSE), a universal integrated circuit card (UICC), a secure digital (SD) card, or an embedded UICC (eUICC), and other hardware/software may be mixed in the security device 200, or the security device 200 may include a separate security processing unit (SPU) in a hardware scheme or the like.

The security device 200 may include a communication interface 210, a processor 220, and a memory 230.

The communication interface 210 may be connected with a host 10 to communicate with the host 10. For example, the communication interface 210 may include various wired and/or wireless communication interfaces 210 for communicating with the host 10.

The processor 220 may be connected with the memory 230 to control the memory 230 and may be configured to execute at least one instruction stored in the memory 230 to implement a description, a function, a procedure, a proposal, a method, and/or operational flowcharts of inventive concepts. For example, the processor 220 may provide operations according to various embodiments of inventive concepts based on the instruction stored in the memory 230. Furthermore, the processor 220 may process information stored in the memory 230 to generate data.

According to some example embodiments, the processor 220 may be a separate processor or may a core included in a multi-core processor. The multi-core processor may be one computing component with two or more independent processors. Each of the processors (or cores) may read and execute an instruction.

According to some example embodiments, the processor 220 may include one or more processing elements capable of being symmetric and/or of being asymmetric. The processing element may refer to hardware or logic for supporting a software thread. For example, a hardware processing element may include one or more of a thread unit, a thread slot, a thread, a process unit, a context, a context unit, a logical processor, a hardware thread, and a core. In some example embodiments, the processing element may refer to a code, such as a software thread, an operating system, or an application, or any hardware capable of being independently associated with the other codes.

According to various example embodiments, the processor 220 may be implemented as one or more of a general-purpose processor, a dedicated processor, an application processor (AP), or the like. For example, the processor 220 may be implemented as or include or be included in, but not limited to, one or more of an operation processor (e.g., a central processing unit (CPU), a graphic processing unit (GPU), and/or the like) including a dedicated logic circuit (e.g., a field programmable gate array (FPGA), application specific integrated circuits (ASICs), and/or the like).

The memory 230 may be connected with the processor 220 to store various pieces of information associated with an operation of the processor 220. For example, the memory 230 may perform some or all of processes or threads controlled by the processor 220 or may store a software code including at least one instruction for performing a description, a function, a procedure, a proposal, a method, and/or operational flowcharts of inventive concepts. For example, the software code may be implemented in a procedural or object-oriented programming language or may be implemented in assembly language or machine language. Alternatively, the software code may be implemented in a declarative programming language. Furthermore, embodiments of inventive concepts may not be limited to any specific program language.

Various types of data, such as a security program and/or a file, may be installed and stored in the memory 230. For example, the memory 230 may store input data, a secret key for encryption/decryption, encrypted data, or parameters (e.g., one or more of an index value, an adjustment initial value, and the like) for performing the Ascon algorithm according to the above-mentioned embodiments.

According to some example embodiments, the processor 220 may receive input data from the host 10 through the communication interface 210.

The processor 220 may perform encryption and/or decryption of the received input data.

The processor 220 may adjust an initial value based on an index value and may output an adjustment initial value. The processor 220 may output encrypted data or decrypted data and first tags in parallel from the input data, based on the adjustment initial value, on a secret key, on a nonce, the input data, and on associated data.

According to some example embodiments, the processor 220 may output the encrypted data (or the decrypted data) and the first tags in parallel based on a security module stored in the memory 230. The security module may have the same structure as a security circuit according to embodiments of FIGS. 5 and 6. For example, the security module may include a plurality of unit security modules. Each unit security module may be configured to have a structure in which a plurality of round permutation blocks, each of which applies round permutation by a specific round number, are sequentially connected with each other.

When the input data includes t*M data blocks, each of the plurality of unit security modules may be configured to encrypt or decrypt t data blocks. The plurality of unit security modules may be provided with M unit security modules. Each unit security module may include an initialization module, an association data processing module, an encryption module (or a decryption module), and a finalization module respectively corresponding to the initialization circuit, the association data processing circuit, the encryption circuit (and/or the decryption circuit), and the finalization circuit of inventive concepts, which are described above. An operation and a function of each module may follow the above-mentioned embodiments.

For example, the processor 220 may generate a first state based on applying a first round permutation block with a first round number to the adjustment initial value, the secret key, and the nonce, may generate a second state based on applying a plurality of second round permutation blocks with a second round number to the first state and the associated data, may generate a third state and encrypted data based on applying the plurality of second round permutation blocks to the second state and the input data, and may generate first tags based on applying the first round permutation block to the third state.

At this time, the secret key and the nonce may have a value common to the processing of outputting the encrypted data or the decrypted data and the first tags in parallel.

The processor 220 may merge the first tags output in parallel through the plurality of unit security modules to output a second tag.

Figure 10:
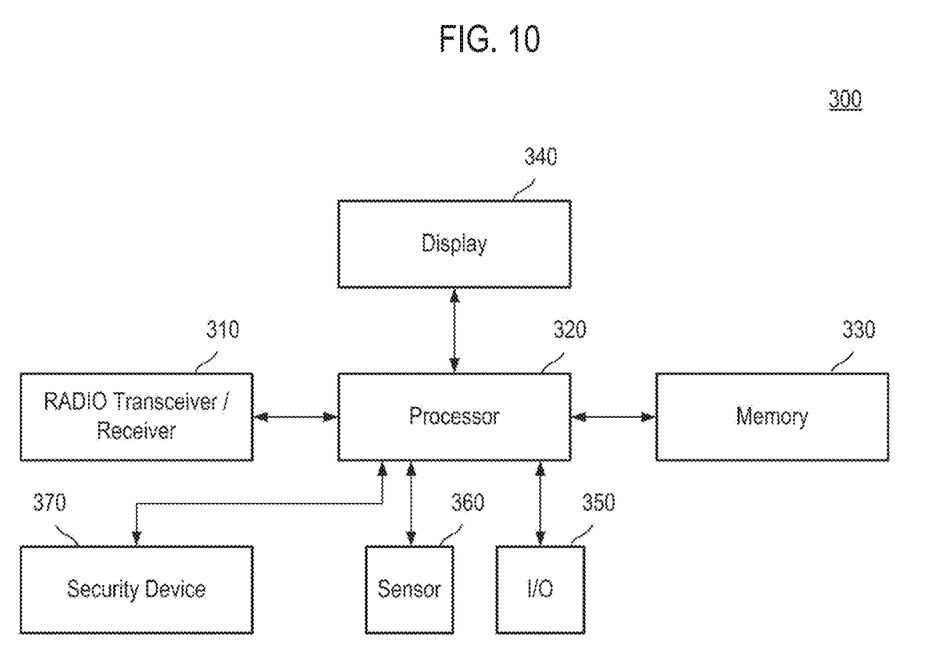
FIG. 10 illustrates an Internet of things (IoT) device to which a security device is applied according to some example embodiments.

FIG. 10 illustrates an Internet of things (IoT) device to which a security device is applied according to some example embodiments.

Referring to FIG. 10, the IoT may refer to a network between things which use wired and/or wireless communication. An IoT device 300 may have an accessible wired or/and wireless interface and may include devices which communicate with at least one or more other devices through the wired or/and wireless interface to transmit or receive data. The accessible interface of the IoT device 300 may include a modem communication interface capable of accessing one or more of a local area network (LAN), a wireless local area network (WLAN), such as a wireless fidelity (Wi-Fi), a wireless personal area network (WPAN), such as Bluetooth, a wireless universal serial bus (USB), ZigBee, near field communication (NFC), radio-frequency identification (RFID), power line communication (PLC), or a mobile cellular network, such as $3^{rd}$ generation (3G), long term evolution (LTE), $4^{th}$ generation (4G), or $5^{th}$ generation (5G). The Bluetooth interface may support Bluetooth low energy (BLE).

In detail, the IoT device 300 may include a communication interface 310 (a RADIO transceiver/receiver) for communicating with the outside. The communication interface 310 may be, for example, a modem communication interface capable of accessing a LAN, a wireless short range communication interface, such as one or more of Bluetooth, Wi-Fi, or ZeeBee, PLC, or a mobile communication network, such as 3G, LTE, 4G, or 5G. The communication interface 310 may include a transceiver and/or a receiver. The IoT device 300 may transmit and/or receive information from an access point or a gateway through the transceiver and/or the receiver. Furthermore, the IoT device 300 may communicate with a user device or another IoT device to transmit and/or receive control information or data of the IoT device 300.

The IoT device 300 may further include a processor or application processor (AP) 320, which performs computation. The IoT device 300 may further include an embedded battery for supplying internal power or a power supply unit which receive power from the outside. Furthermore, the IoT device 300 may include a display 340 for displaying an internal state or data. A user may control the IoT device 300 through a user interface (UI) of the display 340 in the IoT device 300. The IoT device 300 may transmit the internal state and/or the data to the outside through the transceiver and may receive a control instruction and/or data from the outside through the receiver.

A memory 330 may store a control instruction code for controlling the IoT device 300, control data, or user data. The memory 330 may include at least one of a volatile memory or a nonvolatile memory. The nonvolatile memory includes at least one of various memories such as a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (ReRAM), and a ferroelectric RAM (FRAM). The volatile memory may include at least one of various memories such as a dynamic RAM (DRAM), a static RAM (SRAM), and a synchronous DRAM (SDRAM).

The IoT device 300 may further include a storage device. The storage device may include at least one of nonvolatile media such as a hard disk drive (HDD), a solid state drive (SSD), an embedded multimedia card (eMMC), and universal flash storage (UFS). The storage device may store user information provided through an input/output unit (I/O) 350 and pieces of sensing information collected through a sensor 360.

The IoT device 300 may further include a security device 370 connected with the processor 320. The security device 370 may be configured according to the above-mentioned embodiments (e.g., FIGS. 1 to 9) or may perform operations and functions of the above-mentioned embodiments.

The security device 370 may receive plaintext data needing encryption from the processor 320 and may encrypt the plaintext data based on an initial value, a secret key, and a nonce. Alternatively, the security device 370 may decrypt ciphertext data.

According to various example embodiments, the security device 370 may be configured to include a plurality of unit security circuits (e.g., FIGS. 5 and 6), thus distributing and processing and encrypt or decrypt input data including t*M data blocks. Particularly, the security device 370 may adjust the initial value input to every one of the plurality of unit security circuits, thus increasing the efficiency of processing while maintaining security. Furthermore, the security device 370 may be configured to perform encryption or decryption based on the above-mentioned Ascon algorithm, thus having a lightweight computation and circuit area to be more suitable for the IoT device 300.

According to various example embodiments, the security device capable of performing distributed processing and the operation method thereof are provided.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

The above-mentioned contents are detailed embodiments for executing inventive concepts. Inventive concepts may include embodiments in which a design is changed simply or which are easily changed, other than the above-mentioned embodiments. Furthermore, inventive concepts may include technologies capable of being easily modified and executed using embodiments. While inventive concepts has been described with reference to embodiments thereof, it will be apparent to those of ordinary skill in the art that various changes and modifications may be made thereto without departing from the spirit and scope of inventive concepts as set forth in the following claims. Additionally, example embodiments are not mutually exclusive with one another. For example, some example embodiments may include one or more features described with reference to one or more figures, and may also include one or more other features described with reference to one or more other figures.

What is claimed is:

1. A security device, comprising:
    an initial value adjustment circuit configured to adjust an initial value based on an index value and to output at least one adjustment initial value;
    a security circuit including a plurality of unit security circuits, each of which is configured to output encrypted data or decrypted or both the encrypted data and the decrypted data, and a first tag from input data based on the adjustment initial value, on a secret key, on a nonce, on the input data, and on associated data associated with the input data; and
    a tag integration circuit configured to output a second tag by merging the first tags from the plurality of unit security circuits.

2. The security device of claim 1, wherein the initial value adjustment circuit is configured to output the adjustment initial value based on a sum of the initial value and the index value.

3. The security device of claim 1, wherein the plurality of unit security circuits are configured to be connected with each other in parallel.

4. The security device of claim 1, wherein the plurality of unit security circuits are configured to have a structure in which a plurality of round permutation blocks, each of which is configured to apply a round permutation by a specific round number, are sequentially connected with each other.

5. The security device of claim 4, wherein the plurality of round permutation blocks are configured to be connected with a first path associated with outputting the encrypted data or the decrypted data or both the encrypted data and the decrypted data based on XORing the input data and the associated data and on an output of at least one round permutation block among the plurality of round permutation blocks, and the plurality of round permutation blocks are configured to be connected with a second path associated with outputting the first tag based on XORing the secret key and the output of the at least one round permutation block.

6. The security device of claim 1, wherein the secret key and the nonce have a value common to the plurality of unit security circuits.

7. The security device of claim 1, wherein the input data includes t*M data blocks, where t is a number of data blocks capable of being processed by each of the plurality of unit security circuits and M is a number of the plurality of unit security circuits.

8. The security device of claim 1, wherein the plurality of unit security circuits, each of which is configured to encrypt or decrypt t (where t is a natural number greater than or equal to one) data blocks, are configured to be provided with M (where M is a natural number greater than or equal to one) unit security circuits.

9. The security device of claim 1, wherein the tag integration circuit is configured to output the second tag based on XORing the first tags from the plurality of unit security circuits.

10. The security device of claim 8, wherein the plurality of unit security circuits are configured to sequentially input the data blocks along a direction in which the plurality of unit security circuits are arranged.

11. The security device of claim 4, wherein each of the plurality of unit security circuits includes:
an initialization circuit configured to generate a first state, based on applying a first round permutation block with a first round number to the adjustment initial value, to the secret key, and to the nonce;
an association data processing circuit configured to generate a second state, based on applying a plurality of second round permutation blocks with a second round number to the first state and to the associated data;
an encryption circuit configured to generate a third state and pieces of the encrypted data, based on applying the plurality of second round permutation blocks to the second state and to the input data;
and a finalization circuit configured to generate the first tag, based on applying the first round permutation block to the third state.

12. The security device of claim 11, wherein the finalization circuit is configured to generate the first tag based on XORing a fourth state generated from the first round permutation block and the secret key.

13. An operation method of a security device, the operation method comprising:
adjusting an initial value based on an index value;
outputting an adjustment initial value;
outputting encrypted data or decrypted data or both the encrypted data and the decrypted data and first tags in parallel with inputting data, based on the adjustment initial value, on a secret key, on a nonce, on the input data, and on associated data associated with the input data; and
outputting a second tag by merging the first tags output in parallel.

14. The operation method of claim 13, wherein the outputting of the encrypted data or the decrypted data or both the encrypted data and the decrypted data and the first tags in parallel with the input data and the outputting of the second tag are performed based on a plurality of round permutation blocks, each of which including applying round permutation by a specific round number.

15. The operation method of claim 13, wherein the secret key and the nonce have a value common to the outputting of the encrypted data or the decrypted data or both the encrypted data and the decrypted data and the first tags in parallel.

16. The operation method of claim 13, wherein the outputting of the second tag includes:
outputting the second tag based on XORing the first tags output in parallel.

17. A security device, comprising:
a memory; and
a processor connected with the memory and configured to execute at least one instruction,
wherein the processor is configured to execute the at least one instruction to cause the security device to:
adjust an initial value based on an index output;
output an adjustment initial value;
output encrypted data or decrypted data or both the encrypted data and the decrypted data and first tags in parallel with input data, based on the adjustment initial value, on a secret key, on a nonce, the input data, and on associated data associated with the input data; and
output a second tag by merging the first tags output in parallel.

18. The security device of claim 17, wherein the processor is configured to execute the at least one instruction to:
output the encrypted data or the decrypted data or both the encrypted data and the decrypted data and the first tags in parallel based on a plurality of round permutation blocks, each of which includes applying round permutation by a specific round number.

19. The security device of claim 18, wherein the processor is configured to execute the at least one instruction to:
generate a first state, based on applying a first round permutation block with a first round number to the adjustment initial value, to the secret key, and to the nonce;
generate a second state, based on applying a plurality of second round permutation blocks with a second round number to the first state and the associated data;
generate a third state and pieces of the encrypted data, based on applying the plurality of second round permutation blocks to the second state and the input data; and
generate the first tags, based on applying the first round permutation block to the third state.

20. The security device of claim 17, wherein the secret key and the nonce have a value common to at least one of the processing of outputting the encrypted data or the decrypted data or both the encrypted data and the decrypted data, and to the first tags in parallel.

\* \* \* \* \*